(12) United States Patent
Fong et al.

(10) Patent No.: US 8,810,381 B2
(45) Date of Patent: Aug. 19, 2014

(54) VEHICULAR HEADS UP DISPLAY WITH INTEGRATED BI-MODAL HIGH BRIGHTNESS COLLISION WARNING SYSTEM

(75) Inventors: Ching Fong, Ann Arbor, MI (US); Rodrigo Said Ocampo Ayub, Monterrey (MX); Pedro Morales Ramirez, San Nicolas de los Garza (MX); Victor Hugo Salinas Fox, Guadalupe (MX)

(73) Assignee: Yazaki North America, Inc., Canton, MI (US)

( * ) Notice: Subject to any disclaimer, the term of this patent is extended or adjusted under 35 U.S.C. 154(b) by 130 days.

(21) Appl. No.: 13/537,276

(22) Filed: Jun. 29, 2012

(65) Prior Publication Data

US 2014/0002252 A1    Jan. 2, 2014

(51) Int. Cl.
*B60Q 1/00* (2006.01)
*G02B 27/00* (2006.01)
*B60Q 9/00* (2006.01)

(52) U.S. Cl.
CPC ........ *B60Q 1/00* (2013.01); *G02B 27/00* (2013.01); *B60Q 9/008* (2013.01)
USPC ............................ 340/435; 340/436; 340/933

(58) Field of Classification Search
USPC .......................................... 340/435, 436, 933
See application file for complete search history.

(56) References Cited

U.S. PATENT DOCUMENTS

| | | | |
|---|---|---|---|
| 4,884,135 A | 11/1989 | Schiffman | |
| 6,720,938 B2 | 4/2004 | Ohkawara et al. | |
| 7,018,004 B2 | 3/2006 | Chen et al. | |
| 7,158,015 B2 | 1/2007 | Rao et al. | |
| 7,188,012 B2 | 3/2007 | Salmeen et al. | |
| 7,292,940 B2 | 11/2007 | Isogai et al. | |
| 7,480,570 B2 | 1/2009 | Yopp et al. | |
| 7,486,802 B2 | 2/2009 | Hougen | |
| 7,702,425 B2 | 4/2010 | Hougen | |
| 7,868,750 B2 | 1/2011 | Miller et al. | |
| 7,881,868 B2 | 2/2011 | Greene et al. | |
| 7,920,102 B2 | 4/2011 | Breed | |
| 2005/0259033 A1 | 11/2005 | Levine | |
| 2006/0271299 A1* | 11/2006 | Ward et al. ................. | 702/6 |
| 2008/0012697 A1 | 1/2008 | Smith et al. | |
| 2010/0141414 A1* | 6/2010 | Matsumoto et al. ......... | 340/435 |
| 2010/0182140 A1 | 7/2010 | Kohno et al. | |
| 2010/0245513 A1* | 9/2010 | Ihara .......................... | 347/102 |
| 2011/0093165 A1 | 4/2011 | Miller et al. | |
| 2011/0128139 A1 | 6/2011 | Tauchi et al. | |

* cited by examiner

*Primary Examiner* — Daryl Pope
(74) *Attorney, Agent, or Firm* — Harness, Dickey & Pierce, P.L.C.

(57) ABSTRACT

A head-up display device is presented having first and second display units that are provided on a surface of an instrument panel of a vehicle opposed to a windshield of the vehicle. The display device is configured to selectably indicate a plurality of information dots in a row on the windshield such that the plurality of information dots are superposed on a real image in a traveling direction of the vehicle.

20 Claims, 7 Drawing Sheets

VEHICULAR HEADS UP DISPLAY WITH INTEGRATED BI-MODAL HIGH BRIGHTNESS COLLISION WARNING SYSTEM

FIELD

The present disclosure relates to a display for a vehicle and, more particularly, to a bi-modal head-up display device having an integrated obstacle warning system.

BACKGROUND

This section provides background information related to the present disclosure which is not necessarily prior art. Recently, increasing number of various vehicles embrace a display device that incorporates techniques of projecting information directly into a human's field of vision, i.e., a head-up display device. The display device of this kind helps to improve a driver's visibility of the environment around the vehicle. A virtual image presented by the display device is superposed on the landscape that can be seen ahead of the vehicle through a windshield of the automobile. The head-up display typically has a display unit as a main functional unit dedicated to virtual image display and a reflection member provided in an instrument panel of a vehicle, and light emitted by the display unit is reflected off the windshield or a combiner that protrudes from an upper surface of the instrument panel toward a driver, so that the driver recognizes what is presented within his or her field of vision during driving.

In the conventional head-up display devices mentioned above, it is necessary to indicate a virtual image in a location relatively distant from the driver so as not to increase driver's burden of focusing his or her eyes on both the real image farther from the driver and the virtual image presented during driving, and one or more reflection members have to be provided to ensure that the virtual image is viewed by the driver at a predetermined distance. Accordingly, the head-up display device often has to incorporate expensive reflection members that cause a manufacturing cost of the head-up display device as a whole to increase. In addition, mounting of the display system of the head-up display device has to be done with utmost accuracy.

Due to fuel economy requirements and limited real estate within an instrument panel, the size of the conventional virtual image and its display position on the windshield is limited. This inhibits a system's ability to function as a warning system as the emitted light is often difficult to ascertain during a warning condition. These limitations heretofore have limited the size and options for head-up display devices.

SUMMARY

This section provides a general summary of the disclosure, and is not a comprehensive disclosure of its full scope or all of its features. In view of the above-identified drawbacks, the present invention is to provide an in-vehicle display device that can be readily provided on an instrument panel of an automobile with an independent pair of projection systems within a single display unit at a reduced manufacturing cost.

In order to attain the above objective, the in-vehicle display device according to one embodiment of the present teaching includes (a) a first display unit that is provided on a surface of an instrument panel of a vehicle opposed to a windshield of the vehicle, and configured to selectably indicate a plurality of information dots in an array on the windshield such that the plurality of information dots are superposed on a real image in a traveling direction of the vehicle; (b) a collision head-up display unit configured to selectably indicate a second plurality of information dots superimposed on the real image; (c) an obstacle information acquisition unit configured to obtain obstacle information that a driver of the vehicle is to be informed of; and (d) a display control unit that controls the first and collision head-up display units and makes the second display units indicate the information dots that correspond to the obstacle information obtained by the obstacle information acquisition unit.

With the construction and arrangement described above, since the display control unit makes the second display unit indicate the information dots that correspond to the obstacle information obtained by the obstacle information acquisition unit, the in-vehicle display device of the present invention is capable of selectably indicating the necessary information dots on the windshield from among the plurality of information dots. Accordingly, the necessary information dots can be indicated at a desired region on the windshield in accordance with a predetermined line of vision of the driver.

Further, by indicating the desired information dots, the driver's attention and viewpoint can be directed toward the obstacle information from the second display unit and, at the same time, the driver can in an intuitive manner recognize the information dot from the first display unit. Accordingly, the first and second display devices can be readily mounted on the instrument panel immediately adjacent to each other of the vehicle with reduced manufacturing cost. Preferably, the second display unit may be constituted by a plurality of point light sources arranged in a row over a range wider than a range of vision of the driver during driving, each point light source having an intensity greater than information dots from the first display and being configured to indicate one of the information dots, and the display control unit makes the point light sources indicate the information dot that corresponds to the obstacle information unit.

Also, the information dots can be associated with a real image existing in the vehicle's traveling direction or the information dots can be superposed on the real image viewed through the windshield at a location indicated of a forward vehicle's brake lights. Consequently, the driver's consciousness and viewpoint can be moved within the wide range on the windshield and the driver's driving can be effectively supported.

The in-vehicle display device according to one embodiment of the present teachings preferably includes an obstacle detecting unit that detects an obstacle in the traveling direction of the vehicle. The obstacle information acquisition unit obtains the obstacle information indicative of a position of the obstacle detected by the obstacle detecting unit. The display control unit makes the display unit selectably indicate the information dot from among the plurality of information dots in accordance with the obstacle information obtained by the obstacle information acquisition unit such that the selected information dot is superposed on the windshield of the vehicle at a location indicative of a forward vehicle tail light group.

Accordingly, when the obstacle has been detected by the obstacle detecting unit of the in-vehicle display device, the obstacle information is obtained indicative of a location of the obstacle. On the basis of the obtained obstacle information, the display control unit selects the information dots that are to be indicated near the real image of the obstacle on the windshield or to be superposed on the obstacle and the display unit indicates the information dots. These dots can be a horizontal row of dots located on the windshield which normally the brake lights of a forward vehicle would be located.

Since the information dots that have been selected can be associated with or superposed on the real image of the detected obstacle and the information dots are indicated on the windshield at a location of a forward vehicle's break lights, the driver's attention and viewpoint can be moved toward the obstacle by means of the presentation of the information dots and driver's safety driving can be effectively supported.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
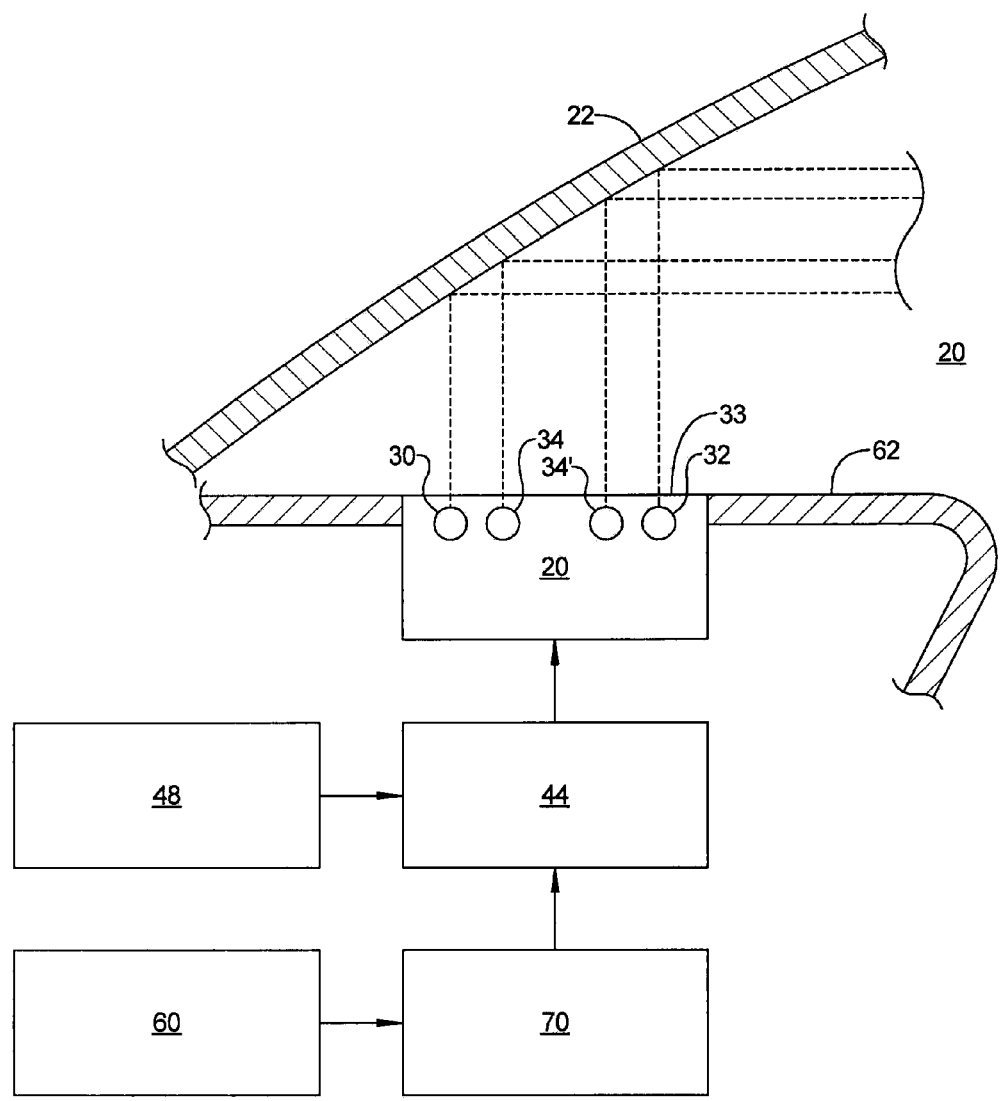
FIGS. 1 and 2 are a head-up display according to the present teachings.
Figure 2:
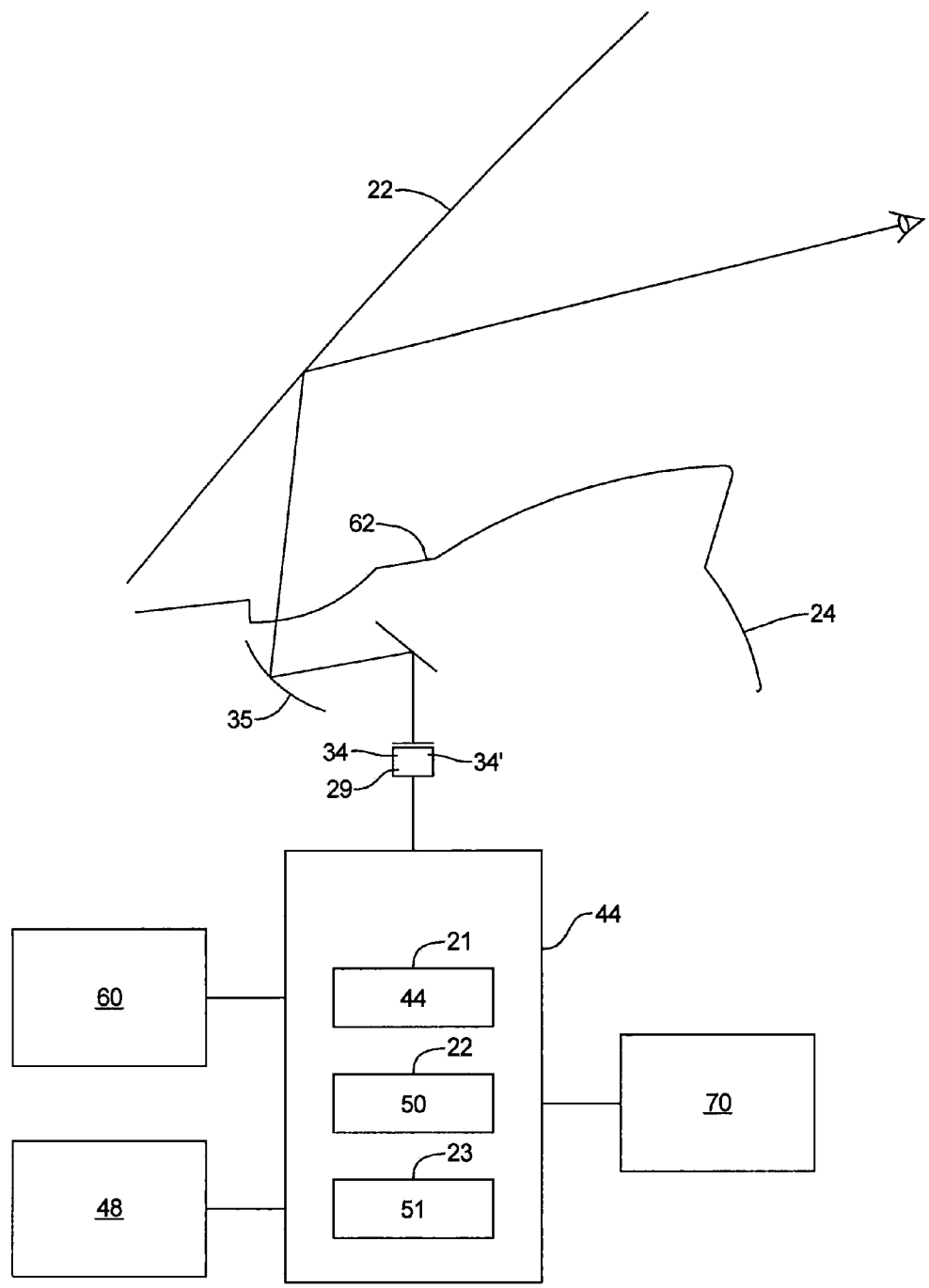
Figure 3:
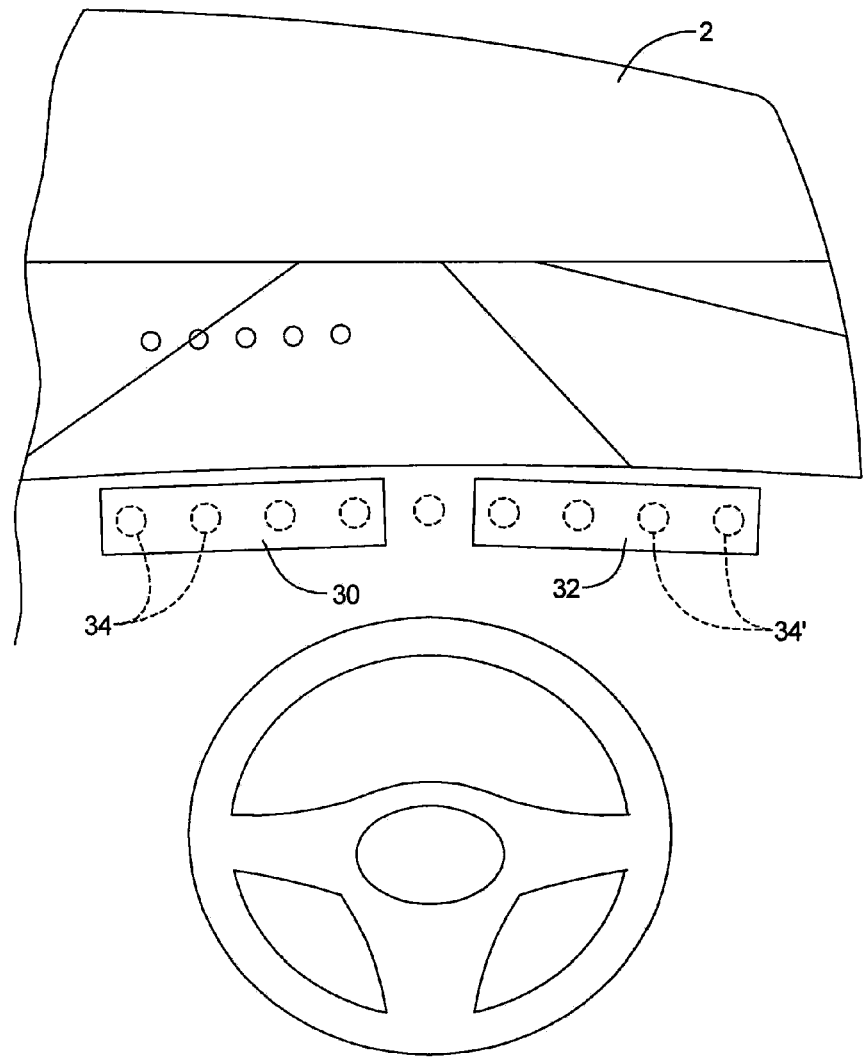
FIGS. 3 and 4 are alternate views seen by the driver according to the present teachings.

An in-vehicle display device according to one embodiment of the present teaching is described below with reference to FIGS. 1 to 8. Referring to FIG. 2, the in-vehicle display device 20 has a first display unit 30, a second display unit 32, a control unit 44, an obstacle detecting unit 60, and a control panel 70. The second display unit 32 herein can be, for instance, a collision head-up display. The display units 10 and 32, the obstacle detecting unit 60, and the control panel 70 are electrically connected to the control unit 44 via known interfaces (not shown).

The display units 10, 32 are provided on a surface 62 of an instrument panel 24 such that the display units 10, 32 are opposed to a windshield 22 of a vehicle. Referring to FIG. 2, the display units 10, 32 have a first and second pairs pluralities of point light sources 34 and 34' (for example, an LED or a bulb). The point light sources 34 and 34' are provided on the instrument panel 24 and are arranged in a width direction of a vehicle body such that a plurality of information dots are selectably displayed on the windshield 22 in a row extending in the width direction of the vehicle body and are superposed on a real image such as an obstacle ahead of the vehicle and a landscape in a direction of driving. Also, the plurality of point light sources 34 are arranged in view of for example a shape of a cross section of the windshield 22 in the width direction of the vehicle body such that the information dots are viewed along a straight line extending in the width direction of the vehicle. Preferably the light sources are reflected using a mirror 35 within the display units 10, 32. As described further below, the arrangement of the plurality of point light sources 34 is adjusted in accordance with geometry of the windshield 22 and the instrument panel 24, as well as the driver's position within the vehicle.

The plurality of point light sources 34 and 34' are mounted on a wiring board 29, and can share the same projection optics. The point light sources 34 and 34' are arranged at an opening 33 of the instrument panel 24 such that the point light sources 34 and 34' continue to the surface 62 of the instrument panel 24 when a case 40 that accommodates the wiring board 32 is attached to the instrument panel 24. The second set of light sources 34' can have an intensity greater than the intensity of the first set 34 of point light sources 34. The second display unit 32 can be a separate board having an LCD strip or LED strip adjacent to a holder for the first display unit. The increased profile may require adjustment to the optics such as a reflecting mirror or lens. This would allow the point light sources to be configured in a non-linear manner to provide a linear row of display lights. Thus, the display unit 30 is incorporated in the surface 62 of the instrument panel 24 to constitute a single unit. The case 40 is covered by a cover 42 made for example of light-transmitting synthetic resin. The cover 42 is a non-reflecting member that does not reflect light such as an incoming light from an outside of the vehicle through the windshield 22.

Also, in the present embodiment, a shielding member 64 is provided that raises from a portion of the surface 62 of the instrument panel 24 upward toward the windshield 22 so as to reside between an eye point EP and the display unit 30. The shielding member 64 prevents the display unit 30 from being directly viewed from the driver's eye point EP.

Still referring to FIG. 2, the control unit 44 is a known microcontroller that has a central processing unit 46, a read-only memory unit 50, and a readable/writable memory unit 51. The read-only memory unit 50 stores programs that make the central processing unit 46 function as an obstacle information acquisition unit 48 and a display control unit 44 as shown in FIG. 1. One of such programs is for display control operation which will be described later. The central processing unit 46 runs programs including the display control operation program stored in the read-only memory unit 50.

The obstacle detecting unit 60 detects existence, a position, and a distance of an obstacle using, for example, laser radar or an ultrasonic sensor, and outputs to the control unit 44 positioning data indicative of the detected position of the obstacle. It should be noted that the positioning data in the embodiment is data that indicates a relative position of the vehicle with respect to an obstacle point. Also, the obstacle detecting unit 60 detects presence of a human body using for example a thermal infrared sensor, and a result of detection is output to the control unit 44 as human body detection data. In this embodiment, the control unit 44 obtains the position data and the human body detection data as "obstacle information."

It should also be noted that the obstacle detecting unit 60 allows various modifications insofar as the obstacle can be duly detected. For example, by using two cameras such as charge-coupled device (CCD) cameras and video cameras, the image data captured by these cameras are output to the control unit 44, and, on the basis of the image data, the control unit 44 may recognize the obstacle through image processing. Other approaches are also possible.

The control panel 70 includes switches and buttons used to handle various settings of the in-vehicle display device 20, so that the driver can specify the settings. Also, the control panel 70 outputs to the control unit 44 a manipulate signal indicative of manipulation made by the driver.

Figure 4:
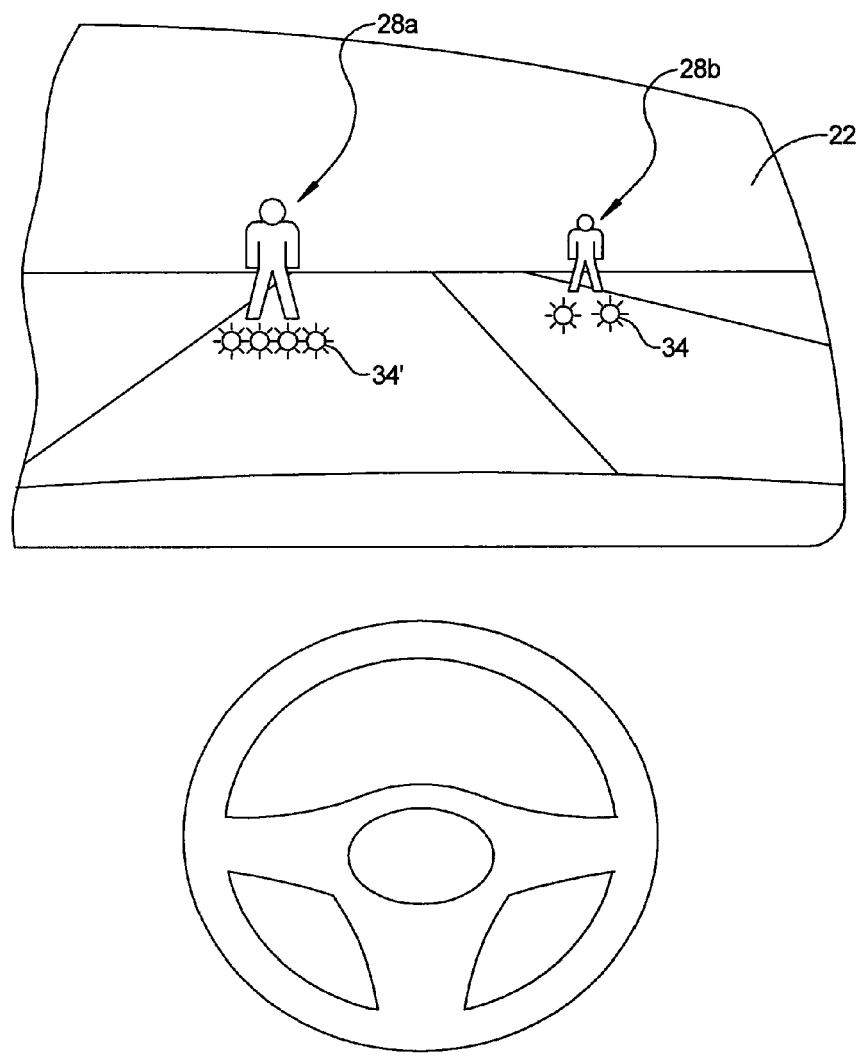

Next, an example of display of the information dots focusing on a pedestrian as the obstacle in front of the vehicle is described with reference to FIG. 4. In the example shown in FIG. 4, when the plurality of information dots should be indicated downward of the windshield 22 along a straight line close to the instrument panel, only the information dots that corresponds to the obstacle 26 are indicated. If a distance between the vehicle and the obstacle 26 is small, the plurality (four in FIG. 4) of the information dots are indicated. If the distance is relatively large, then fewer (two in FIG. 4) information dots are indicated. These dots, as emitted from the second set of point light sources 34', can be positioned at a location where a driver would expect forward vehicle brake lights.

It should be noted that a constant number of the information dots can be indicated in response to the detected obstacle 26 regardless of the distance between the vehicle and the obstacle 26, or the number of the information dots to be indicated may vary depending upon types of the obstacle information. Also, the mode of display of the information dots may be specified by the driver. For example, when viewed from the driver's eye point EP, a shape of the information dot can be such that the driver can recognize the dots and yet the driver's range of vision in the vehicle's traveling direction is not interrupted.

Figure 5:
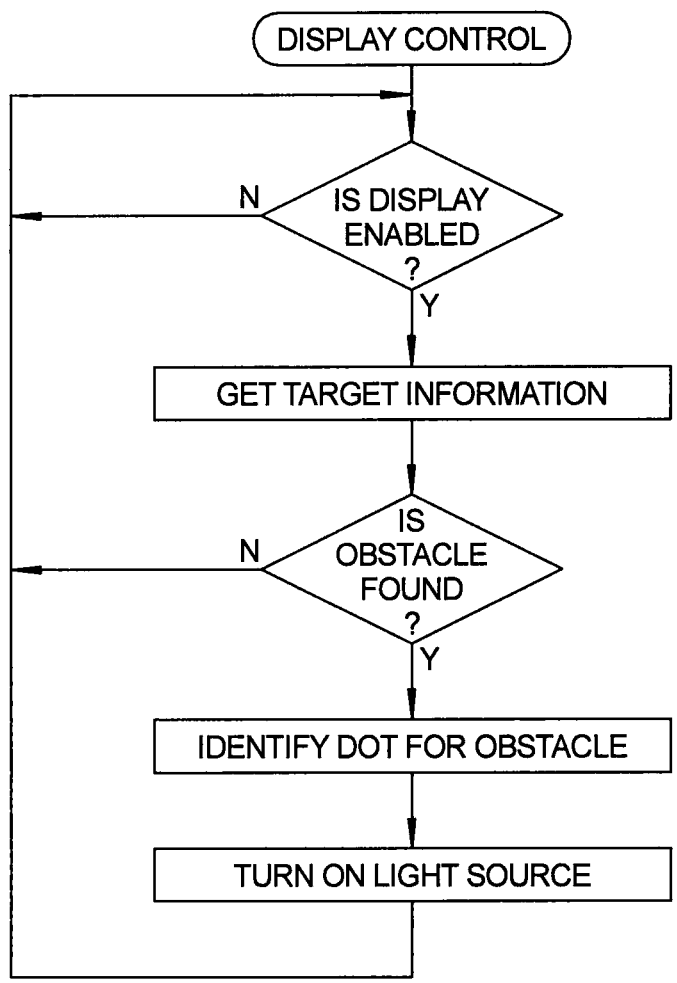
FIG. 5 is a flowchart describing the functions of the system.

An example of the display control by the central processing unit 46 of the in-vehicle display device 20 is explained below with reference to a flow chart shown in FIG. 5. Note that the display control is forcibly terminated when the power is shut down or upon a termination request. When the in-vehicle display device 20 is activated and the central processing unit 46 runs the display control operation program, it is judged whether display functionality is set to an enabled mode or a disabled mode on the basis of the settings of the display mode information stored in the memory unit 54. If the display functionality is disabled, the above judgment is repeated. If the display functionality is enabled, acquisition of the obstacle information is attempted. If data on the existence, position, and distance of the obstacle is obtained by the obstacle detecting unit 60, the data is acquired as the obstacle information and is stored in the memory unit 54.

On the basis of existence or absence of the data on the existence, position, and distance of the obstacle 26 contained in the obstacle information stored in the memory unit 54, it is judged whether or not there is an obstacle 26 ahead of the vehicle in the traveling direction. If there is not the obstacle 26 found, the process goes back, and a sequence of the previous steps will be repeated. If there exists the obstacle 26, the operation proceeds to the detected obstacle logs.

On the basis of the data on the position and distance of the obstacle 26 contained in the obstacle information; and the display area definition information stored in the memory unit 54, a visually identified position of the obstacle 26 on the windshield 22 is estimated, the information dots that correspond to the visually identified position are identified and stored in the central processing unit 46, and then the process continues. It should be noted that, with regard to how to specify the information dots, a definition table that corresponds to sizes and distances of the obstacle 26 may be pre-stored in the central processing unit 46 and a number and a position of the information dots to be indicated may be specified on the basis of the definition table. Another possible approach would be to specify an area of the windshield 22 and then specify the information dots that correspond to the specified windshield area.

A request to enable the relevant point light sources 34' that correspond to the warning information dots identified by the central processing unit 46 and to disable other point light source 34 is sent to the display unit 30. The display unit 32 turns on the relevant point light sources 34' only. The information dots are indicated at a region corresponding to the obstacle 26 viewed on the windshield 22. The process returns, and the sequence of the steps is repeated.

As has been explained in the foregoing, the central processing unit 46 performs the display control, serving as the display control unit and the obstacle information acquisition unit 48 according to the preferred embodiment of the present invention. An example mode of operation and effects of the in-vehicle display device 20 with the above-described configuration are explained below with reference to FIG. 4.

When the display mode information in the memory unit 54 is set to the enabled mode, the obstacle detecting unit 60 detects the obstacle 26 (for example, a pedestrian). Referring to FIG. 4, in a case where two pedestrians, i.e., a pedestrian 28a standing or walking on a traffic lane in which the vehicle is traveling and near the vehicle, and a pedestrian 28b standing or walking on an opposite traffic lane and farther from the vehicle are detected, several information dots corresponding to the pedestrian 28a and the two information dots corresponding to the pedestrian 28b are specified on the basis of the data on the position of the obstacle 26, and the point light sources 34 corresponding to the specified information dots are turned on.

As a result, the lights emitted by the point light sources 34 are reflected off the windshield 22 of the vehicle toward the driver's eye point EP and, thus, several information dots are indicated to the left side close to the instrument panel 24 and two information dots are indicated to the right side spaced from the instrument panel 24. In this manner, the driver can move his or her line of sight to a windshield area above the indicated information dots to recognize the approaching obstacle 26.

The information dots 34' relevant to the obstacle information are selected from among the plurality of information dots and indicated on the windshield 22. Accordingly, the display unit 32 can be provided on the surface of the instrument panel 24. The display device 20 is not bothered by a problem of minutely accurate mounting of the display device 20 and providing a sufficient space for accommodating the display device 20, which a conventional head-up display device would have to face. Also, since the information dots are selectably indicated, the distance between the display unit 30 and the windshield 22 can be reduced, and the display unit 30 can directly project the information dots on the windshield 22 without using a conventional costly reflection member. The display device 20 can be readily provided on the instrument panel 24 of the vehicle with reduced cost. Further, even when the information dots are indicated over a wide range of the windshield 22, it is possible to avoid degradation of driver's visibility. Also, by indicating a desired information dots, driver's consciousness and viewpoint are directed to the obstacle information, and the driver can recognize the information dots in an intuitive manner.

Also, since the plurality of point light sources 34' constituting the display unit 32 are arranged in the row extending in the width direction of the vehicle body over a range wider than the driver's field of vision, the obstacle information can be selectably indicated over a wide range of the windshield 22, and the indicated information dots can be associated with the real image found ahead of the vehicle in its traveling direction. Accordingly, the driver can place his or her attention and viewpoint over the wide range of the windshield 22 and thus driver's driving can be effectively supported.

Because the drivers can have various heights or locate their seats at different heights, typical HUDs have mechanisms which allow for the height adjustment of the HUD image, which is reflected off the windshield. Misadjusting the image height mechanism could render either the top or the bottom portion of the image invisible. For instance, if a tall driver misadjusted the image height to a position designed for short driver, the top portion of the image could be invisible, and vice versa. With two rows of warning LEDs, one immediately above and one immediately below the HUD image, no matter how the image height mechanism is misadjusted, at least one row of warning LEDs are visible.

Further, since the information dots can be associated with the real image of the detected obstacle 26 and the selected information dots can be indicated on the windshield 22, the driver can move his or her attention and viewpoint toward the obstacle 26 by virtue of the information dots and, thus, the driver's safe driving can be effectively supported. Because drivers can have various heights or locate their seats at differing heights, typically HUDs have mechanisms which allow for the relative adjustment of display on the windshield. While a driver may decide to have the HUD positioned in a manner where it is not visible, it is possible to have a pair of LED warning rows. The first and second rows would be positioned in a manner that when the HUD is rotated into its top most or the bottom most position, at least one of the first or second rows will be visable.

Figure 6:
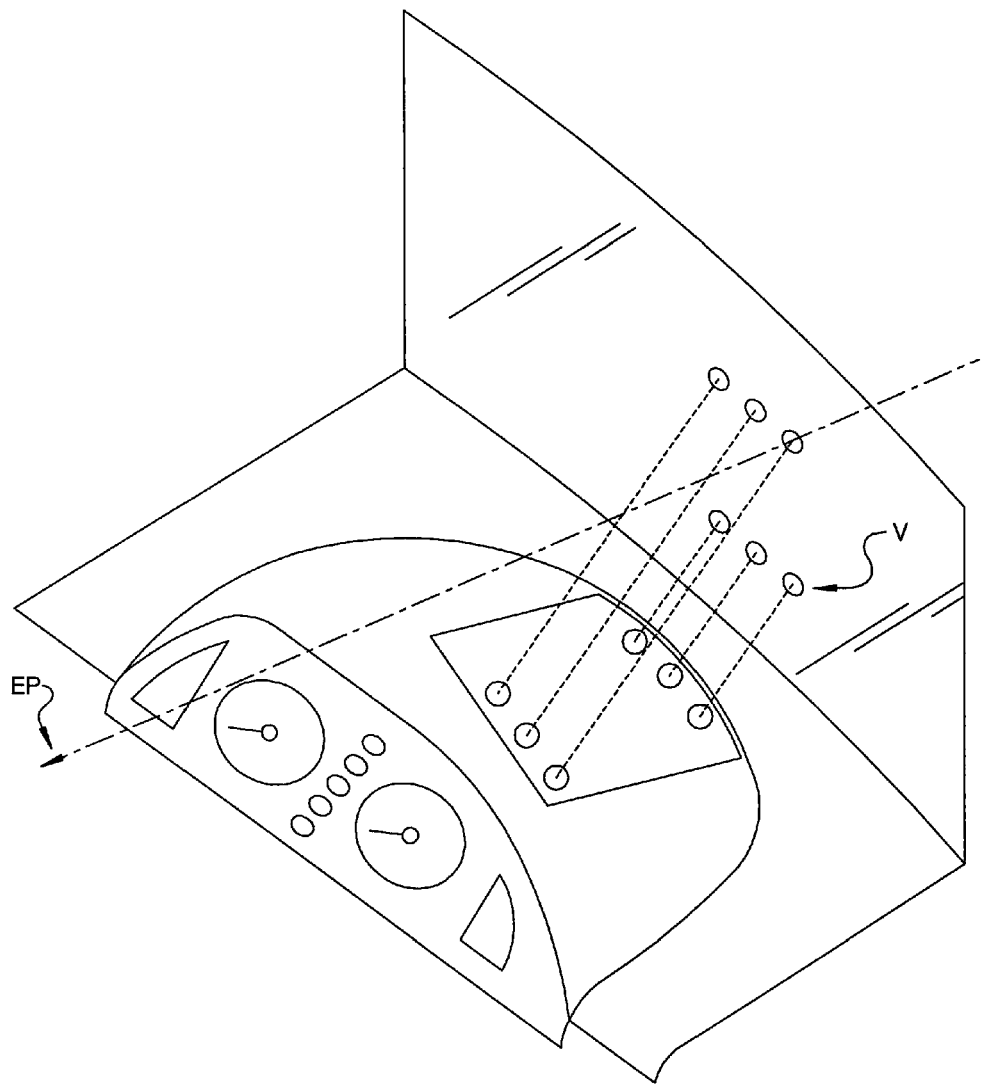
FIGS. 6 and 7 represent alarm signals according to the present teachings.
Figure 7:
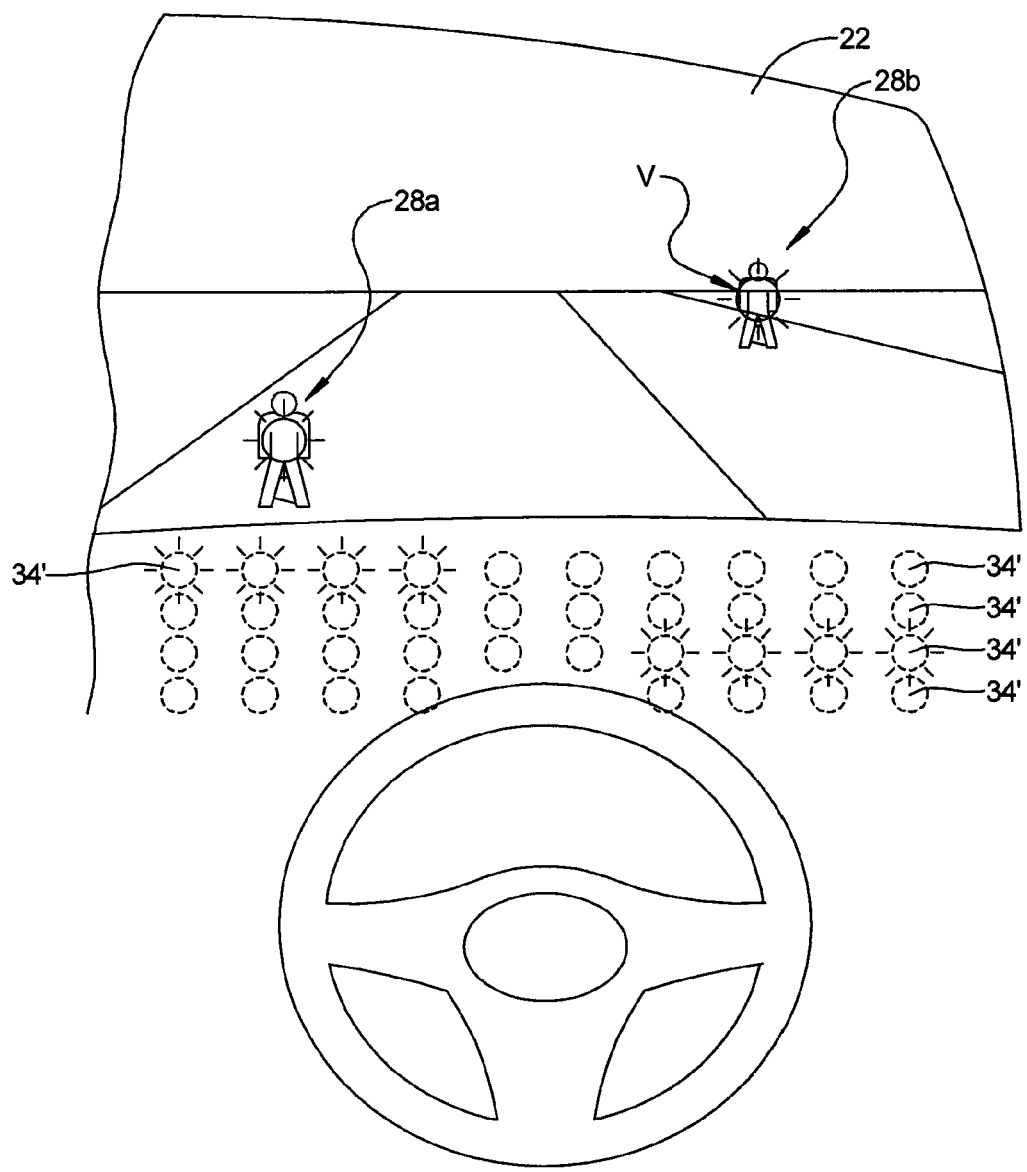

As shown in FIGS. 6 and 7, the display unit 30 may be provided on a sloping surface of the raised portion 66 of the instrument panel 24 with a meter 72 incorporated in the instrument panel 24. By providing the display unit 30 on the raised portion 66, shielding member 64 does not need to be provided on the instrument is panel 3, which allows flexibility in design of the instrument panel 24. As another alternative, the position of the point light sources 34 constituting the display unit 30 may be lowered to somewhere in the instrument panel 24 such that the point light source 34 cannot directly be seen by the driver.

By constituting the display units 30 and 32 by the point light sources 34 and 34' arranged in the rectangular array as shown in FIG. 8, the display device 20 is capable of indicating the information dots when the pedestrians 5a and 5b have been identified such that the information dots are superposed upon the real images of the pedestrians 5a and 5b, respectively. The high of the dots on the windshield can be assigned based on seating location for the driver of the vehicle. Such a mode of display helps the system estimate the position of the pedestrians 5a and 5b and a distance between the vehicle and the pedestrians 5a and 5b, and drive safely and carefully even when the visibility in the vehicle's traveling direction is not favorable.

In this embodiment, all the entire display area on the windshield 22 is used as the display area in which information can be presented by the display unit 30. Of course, this is just one of the possible approaches that can be achieved by the display device 20 according to the preferred embodiment of this invention.

Referring to FIGS. 6 and 7, a display area E1, which is specified by display area definition information of the display device 20, is a region on the windshield 22 in which the plurality of point light sources 34 can project the information dots. A display area E2 is a range of vision of the driver within the display area E1. Although the display area E2 is fixed for the sake of simplicity, the display area E2 may be movable in response to the driver's line of sight.

The memory unit 54 stores the area setting information that is used to enable or disable presentation of the information dots on the predetermined display area E2 of the windshield 22. More specifically, the memory unit 54 serves as an area-setting-information storage unit. The ROM memory unit 50 stores an area-setting program that allows the area setting information to be specified by the driver via the control panel 70.

When both of the display area E1 and the display area E2 are enabled by the area setting information stored in the memory unit 54, the obstacle detecting unit 60 detects the obstacle 26 (i.e., the pedestrian 28a) residing within the display area E2, and the display device 20 makes the point light sources 34 that correspond to the eight information dots on the basis of the positioning data such that the real image of the pedestrian 28a is surrounded by the information dots.

When the display area E2 is disabled by the area setting information stored in the memory unit 54 and the obstacle detecting unit 60 detects the pedestrian 28a found near the vehicle and in the traffic lane in which the vehicle is traveling, and the pedestrian 28b found away from the vehicle and in the opposite traffic lane with respect to the vehicle, then the point light sources 34 that correspond to the eight information dots are illumined on the basis of the positioning data corresponding to the pedestrian 28b. In this case, since the display area E2 is disabled, the information dots are not indicated for the pedestrian 28a found in the display area E2.

Accordingly, the in-vehicle display device 20 can focus the driver's attentions on the farther pedestrian 28b who is otherwise difficult for the driver to recognize, by superposing the plurality of information dots only upon the farther pedestrian 28b. Also, since the nearer pedestrian 28a is within the driver's range of vision, the information dots do not need to be indicated for the nearer pedestrian 28a. Accordingly, presentation of the information dots for the display area E2 may only be enabled at night and in a bad weather by the area setting information stored in the memory unit 54.

In this manner, the display area E2 in which the information dots are indicated can be specified depending upon the area setting information and it can be selected whether or not the information dots are indicated in the display area E2. The information dots can be indicated according to driver's preference and needs. Also, since two areas, i.e., the display area E1 and the display area E2 that corresponds to the driver's range of vision are defined, the presentation of the information dots does not interrupt the driver's range of vision and driver's visibility during driving can be improved.

In another embodiment, the first display unit 30 is constituted by an organic electro luminescence (EL) display or a liquid crystal panel may be provided on the surface 62 of the instrument panel 24 over a range wider than the driver's range of vision so as to indicate the information dots in one row or in the rectangular array, or any other arrangement that is not discussed in the embodiment. In this embodiment, the second display unit 32 may be a line of higher intensity LEDs. The first display can have a luminescence of less than 10,000 nits and, preferably, a luminescence of less than 10,000 nits. The brightness of the second display or crash avoidance system should have a brightness of greater than 15,000 nits and, preferably, a brightness of greater than 20,000 nits.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An in-vehicle display device comprising:
   an obstacle detecting unit configured to detect an obstacle in a traveling direction of the vehicle;
   a display unit provided on a surface of an instrument panel of a vehicle, opposed to a windshield of the vehicle, the display unit having first and second displays that are provided on a surface of an instrument panel of a vehicle opposed to a windshield of the vehicle, and configured to selectably indicate a plurality of information dots in a row on the windshield such that the plurality of information dots are superposed on a real image in a traveling direction of the vehicle;
   an obstacle information acquisition unit configured to obtain obstacle information that a driver of the vehicle is to be informed of, the obstacle information being indicative of a size, distance, and position of the obstacle detected by the obstacle detecting unit; and
   a display control unit configured to control the first and second displays and instruct of the displays to indicate at least one of the information dots that corresponds to the obstacle information obtained by the obstacle information acquisition unit, wherein the number and position of the information dots indicated being determined in dependence upon size, distance, and position of the obstacle detected by the obstacle detecting unit.

2. The in-vehicle display device as set forth in claim 1, wherein the display unit includes a plurality of point light sources arranged in a row which is projected within a predefined range of vision of the driver during driving, each point light source being configured to indicate one of the information dots, said predefined range of vision indicative of a location of a forward vehicle brake lights.

3. The in-vehicle display device as set forth in claim 1 wherein the second display is positioned immediately adjacent the first display.

4. The in-vehicle display device as set forth in claim 2 wherein the display control unit specifies a display area in which the information dot is to be indicated and directs the display unit to indicate the information dot in the specified display area in accordance with area setting information stored in the display unit.

5. An in-vehicle display device according to one embodiment of the present invention comprising:
   (a) obstacle information acquisition unit configured to produce obstacle location information;
   (b) a first display having a brightness of less than 15,000 nits that is provided on a surface of an instrument panel of a vehicle opposed to a windshield of the vehicle, and configured to selectably indicate a plurality of information dots in an array on the windshield such that the plurality of information dots are superposed on a real image in a traveling direction of the vehicle;
   (c) a collision display having a brightness of greater than 20,000 nits configured to selectably indicate a second plurality of information dots superimposed on the real image indicative of a warning; and
   (d) a display control unit that controls the first and collision displays and controls the second display units to indicate the information dots that correspond to the obstacle information obtained by the obstacle information acquisition unit.

6. The in-vehicle display device as set forth in claim 5 wherein the display control unit instructs the collision display to indicate the information dots that correspond to the obstacle information obtained by the obstacle information acquisition unit.

7. The in-vehicle display device as set forth in claim 6 wherein the display control unit selectably indicates the necessary information dots on the windshield from among the plurality of information dots.

8. The in-vehicle display device as set forth in claim 7 wherein, the information dots are projected at a predefined region on the windshield in accordance with driver position data.

9. The in-vehicle display device as set forth in claim 7 wherein the luminosity of the information dots projected at a predefined region on the windshield are projected as a function of the detected object.

10. The in-vehicle display device as set forth in claim 7 wherein information dots are associated with a real image existing in the vehicle's traveling direction.

11. The in-vehicle display device as set forth in claim 7 wherein information dots are superposed on the real image viewed through the windshield at a location indicated of a forward vehicle's brake lights.

12. An in-vehicle display device according to one embodiment of the present invention comprising:
 (a) an obstacle information acquisition unit producing obstacle location information;
 (b) a first display that is provided on a surface of an instrument panel of a vehicle opposed to a windshield of the vehicle, said first display being one of an organic electro luminescence display, DLP, or a liquid crystal panel;
 (c) a collision display comprising an array of LEDs configured to selectably indicate a second plurality of information dots superimposed on the real image indicative of a warning; and
 (d) a display control unit that controls the first and collision displays and controls the collision display units to indicate the information dots that correspond to the obstacle location information obtained by the obstacle information acquisition unit.

13. The in-vehicle display device as set forth in claim 10 wherein the collision display is positioned immediately adjacent to the first display and shares the same optics.

14. The in-vehicle display device as set forth in claim 10 wherein the collision display comprises an array of LCDs adjacent to the first display.

15. The in-vehicle display device as set forth in claim 12 wherein the collision display comprises a plurality of point light sources arranged in a row over a range wider than a range of vision of the driver during driving, each point light source being configured to indicate one of the information dots.

16. The in-vehicle display device as set forth in claim 12 wherein information dots are associated with a real image existing in the vehicle's traveling direction.

17. The in-vehicle display device as set forth in claim 12 wherein information dots are superposed on the real image viewed through the windshield at a location indicated of a forward vehicle's brake lights.

18. The in-vehicle display device as set forth in claim 12 wherein the obstacle detecting unit detects a distance of an obstacle using, one of a laser radar, ultrasonic sensor, in-vehicle camera or mm wave radar.

19. The in-vehicle display device as set forth in claim 16 wherein the obstacle detecting unit outputs positioning data indicative of the detected position of the obstacle.

20. The in-vehicle display device as set forth in claim 19 wherein the display unit selectably indicates the information dot from among the plurality of information dots in accordance with the obstacle information obtained by the obstacle information acquisition unit.

* * * * *